(12) United States Patent
Sridhar et al.

(10) Patent No.: US 9,166,246 B2
(45) Date of Patent: Oct. 20, 2015

(54) INCREASING THERMAL DISSIPATION OF FUEL CELL STACKS UNDER PARTIAL ELECTRICAL LOAD

(71) Applicant: Bloom Energy Corporation, Sunnyvale, CA (US)

(72) Inventors: K. R. Sridhar, Los Gatos, CA (US); Ian Russell, Sunnyvale, CA (US); Matthias Gottmann, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 0 days.

(21) Appl. No.: 14/187,546

(22) Filed: Feb. 24, 2014

(65) Prior Publication Data

US 2014/0170516 A1    Jun. 19, 2014

Related U.S. Application Data

(62) Division of application No. 12/591,872, filed on Dec. 3, 2009, now Pat. No. 8,685,579, which is a division of application No. 11/125,267, filed on May 10, 2005, now Pat. No. 7,700,210.

(51) Int. Cl.
*H01M 8/24* (2006.01)
*H01M 8/04* (2006.01)
*H01M 8/06* (2006.01)
*H01M 8/18* (2006.01)
(Continued)

(52) U.S. Cl.
CPC .......... *H01M 8/249* (2013.01); *H01M 8/04007* (2013.01); *H01M 8/04619* (2013.01); *H01M 8/04753* (2013.01); *H01M 8/0625* (2013.01); *H01M 8/244* (2013.01); *H01M 8/2425* (2013.01); *H01M 8/184* (2013.01); *H01M 2008/1293* (2013.01); *H01M 2008/147* (2013.01); *Y02E 60/50* (2013.01); *Y02E 60/525* (2013.01); *Y02E 60/526* (2013.01)

(58) Field of Classification Search
CPC ............ H01M 8/249; H01M 8/04007; H01M 8/04619; H01M 8/04753; H01M 8/0625; H01M 8/2425; H01M 8/184; H01M 8/244
See application file for complete search history.

(56) References Cited

U.S. PATENT DOCUMENTS

| | | | |
|---|---|---|---|
| 4,041,210 A | 8/1977 | Van dine | |
| 4,182,795 A | 1/1980 | Baker et al. | |
| 4,792,502 A | 12/1988 | Trocciola et al. | |

(Continued)

FOREIGN PATENT DOCUMENTS

| WO | WO 2004/013258 A1 | 2/2004 |
|---|---|---|
| WO | WO 2004/093214 | 10/2004 |

OTHER PUBLICATIONS

Austin, "Cell and Stack Construction: Low-Temperature Cells," *Fuel Cells: A Review of Government—Sponsored Research, 1950-1964*, NASA SP-120, pp. 101-102, (1967).

(Continued)

*Primary Examiner* — Helen O Conley
(74) *Attorney, Agent, or Firm* — The Marbury Law Group PLLC

(57) ABSTRACT

A method of operating a high temperature fuel cell system containing a plurality of fuel cell stacks includes operating one or more of the plurality of fuel cell stacks at a first output power while operating another one or more of the plurality of the fuel cell stacks at a second output power different from the first output power.

10 Claims, 7 Drawing Sheets

(51) Int. Cl.
  *H01M 8/12* (2006.01)
  *H01M 8/14* (2006.01)

(56) References Cited

U.S. PATENT DOCUMENTS

| | | | |
|---|---|---|---|
| 4,898,792 | A | 2/1990 | Singh et al. |
| 4,917,971 | A | 4/1990 | Farooque |
| 4,983,471 | A | 1/1991 | Reichner et al. |
| 5,034,287 | A | 7/1991 | Kunz |
| 5,047,299 | A | 9/1991 | Shockling |
| 5,143,800 | A | 9/1992 | George et al. |
| 5,169,730 | A | 12/1992 | Reichner et al. |
| 5,170,124 | A | 12/1992 | Blair et al. |
| 5,302,470 | A | 4/1994 | Okada et al. |
| 5,441,821 | A | 8/1995 | Merritt et al. |
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,955,039 | A | 9/1999 | Dowdy |
| 6,013,385 | A | 1/2000 | Dubose |
| 6,051,125 | A | 4/2000 | Pham et al. |
| 6,087,028 | A | 7/2000 | Goto |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | Dubose |
| 6,451,466 | B1 | 9/2002 | Grasso et al. |
| 6,531,243 | B2 | 3/2003 | Thom |
| 6,623,880 | B1 | 9/2003 | Geisbrecht et al. |
| 6,821,663 | B2 | 11/2004 | McElroy |
| 2001/0001287 | A1* | 5/2001 | Ueno et al. .............. 429/22 |
| 2001/0049035 | A1 | 12/2001 | Haltiner, Jr. et al. |
| 2002/0028362 | A1 | 3/2002 | Prediger et al. |
| 2002/0058175 | A1 | 5/2002 | Ruhl |
| 2002/0106544 | A1 | 8/2002 | Noetzel et al. |
| 2002/0142208 | A1 | 10/2002 | Keefer et al. |
| 2003/0157386 | A1 | 8/2003 | Gottmann |
| 2003/0162067 | A1 | 8/2003 | McElroy |
| 2003/0180590 | A1 | 9/2003 | Hase et al. |
| 2003/0196893 | A1 | 10/2003 | McElroy |
| 2003/0205641 | A1 | 11/2003 | McElroy |
| 2004/0191597 | A1 | 9/2004 | McElroy |
| 2004/0191598 | A1 | 9/2004 | Gottmann |
| 2004/0202914 | A1 | 10/2004 | Sridhar et al. |
| 2004/0224193 | A1 | 11/2004 | Mitlitsky et al. |
| 2005/0048334 | A1 | 3/2005 | Sridhar et al. |
| 2005/0106432 | A1* | 5/2005 | Converse et al. .............. 429/23 |
| 2006/0147771 | A1 | 7/2006 | Russell et al. |

OTHER PUBLICATIONS

"Low Cost, Compact Solid Oxide Fuel Cell Generator," (Technology Management Inc.).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

* cited by examiner

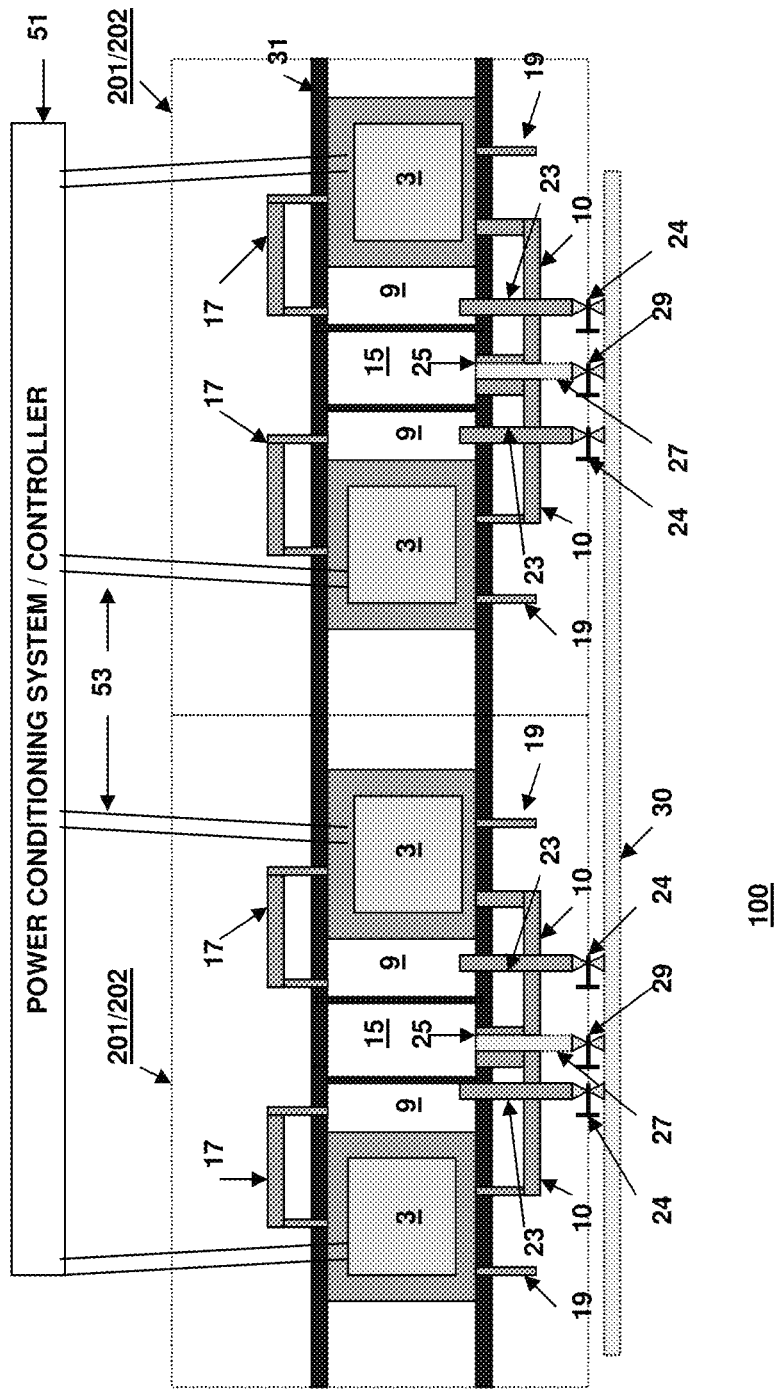

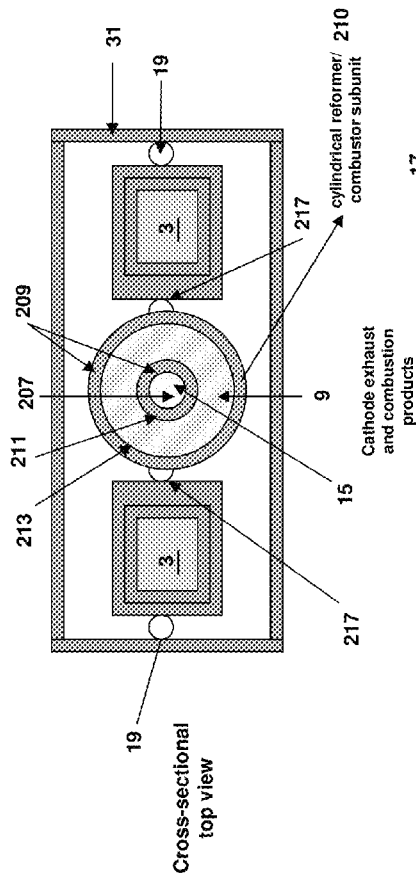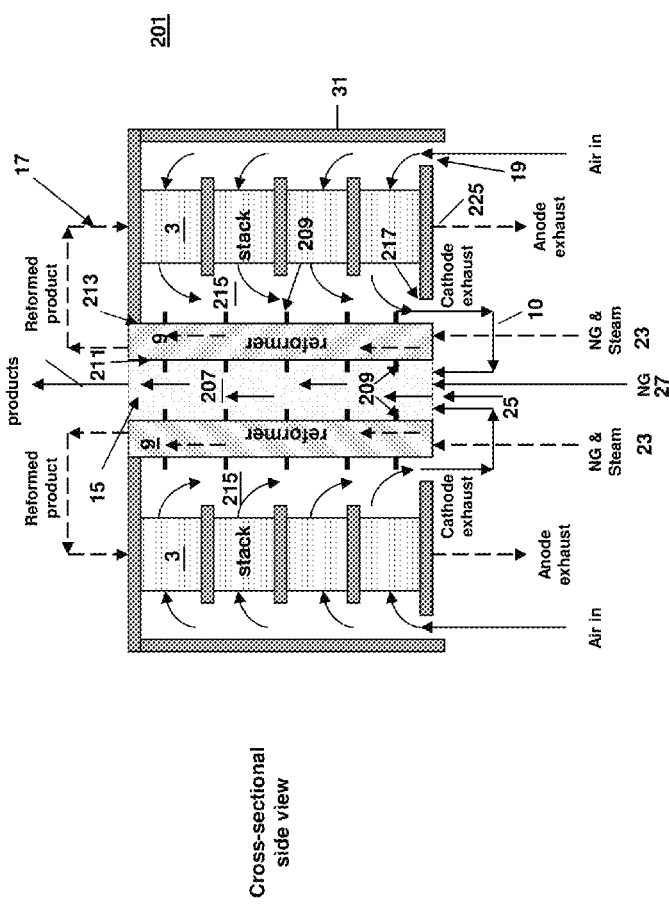

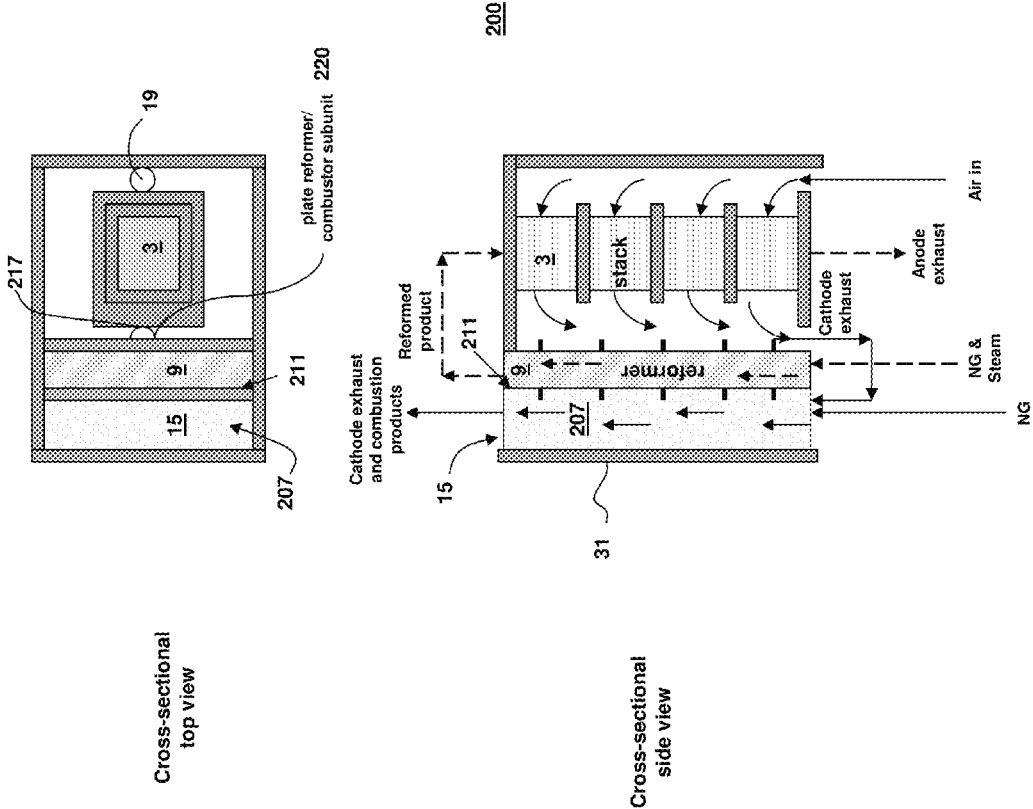
Fig. 6A Cross-sectional top view
Fig. 6B Cross-sectional side view

INCREASING THERMAL DISSIPATION OF FUEL CELL STACKS UNDER PARTIAL ELECTRICAL LOAD

This application is a Divisional of U.S. application Ser. No. 12/591,872, filed Dec. 3, 2009, which is a Divisional of U.S. application Ser. No. 11/125,267, filed May 10, 2005, now U.S. Pat. No. 7,700,210, which are incorporated herein by reference in their entirety.

BACKGROUND OF THE INVENTION

The present invention is generally directed to fuel cells and more specifically to fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where oxygen from oxygen ions combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In most applications of high temperature fuel cells, a number of cells are connected in series forming a cell "stack." Cells connected in series operate at the same current and are thereby locked to the same operating state. In order to operate efficiently, these fuel cells in the stack have to be maintained at or near their nominal or designed operating temperature. The fuel cells are usually designed to operate at a high or even a maximum load at which the fuel cells achieve the nominal or designed operating temperature. Thus, under high electrical loads, high temperature fuel cell stacks dissipate enough heat to maintain their nominal or designed operating temperature (provided adequate thermal management/insulation). However, sometimes the fuel cells operate at a partial or low load, which is lower than the designed high or maximum operating load. This may occur when there is low power demand on the fuel cell stack, for example. At partial or low load, the amount of heat dissipated quickly tapers off and the high temperature fuel cell stack may drop in operating temperature. Generally, a drop in operating temperature may be acceptable, but at lower temperature the stack has reduced power generation capabilities and may be unable to provide sufficient power when the power demand increases suddenly.

BRIEF SUMMARY OF THE INVENTION

One aspect of present invention provides a method of operating a high temperature fuel cell system containing a plurality of fuel cell stacks. The method comprises operating one or more of the plurality of fuel cell stacks at a first output power while operating another one or more of the plurality of the fuel cell stacks at a second output power different from the first output power.

BRIEF DESCRIPTION OF THE DRAWINGS

FIGS. 3A and 3B are schematic side cross sectional views of systems of the embodiments of the present invention.

FIGS. 4A and 5A are top cross sectional views of portions of the system of FIG. 3B.

FIGS. 4B and 5B are side cross sectional views of portions of the system of FIG. 3B which correspond to the portions shown in FIGS. 4A and 5A, respectively.

FIG. 6A is a top cross sectional view of a portion of the system of FIG. 3A.

FIG. 6B is a side cross sectional view of a portion of the system of FIG. 3A, which corresponds to the portion shown in FIG. 6A.

DETAILED DESCRIPTION OF THE PREFERRED EMBODIMENTS

In one embodiment of the invention, the present inventors realized that in a fuel cell system containing a plurality of fuel cell stacks, if the one or more stacks in the system are operating at a lower output power than one or more other stacks, while the sum of the output power from all of the stacks in the system still meets the total required or desired output power, then the combined thermal dissipation of the stacks will be higher compared to operation of all the stacks in the system at equal output power. Thus, operating different stacks at different output power from each other while the sum of the output power from the stacks in the system still meets the total required or desired output power provides a higher heat dissipation. Each stack is thermally integrated with one or more other stacks, such that each stack provides dissipated heat to one or more other stacks and/or absorbs heat from one or more other stacks. The stacks may be operated at different output power during partial or low system load to increase the heat dissipation. Alternatively, the stacks may be operated at different output power during high or maximum system load to increase the heat dissipation if the heat dissipation during high or maximum load is not sufficient when the stacks all operate at the same output power. It should be noted that the term "output power" as used herein generally refers to the output power density measured in the units of Watts per unit area of the fuel cells in the stack.

Figure 1:
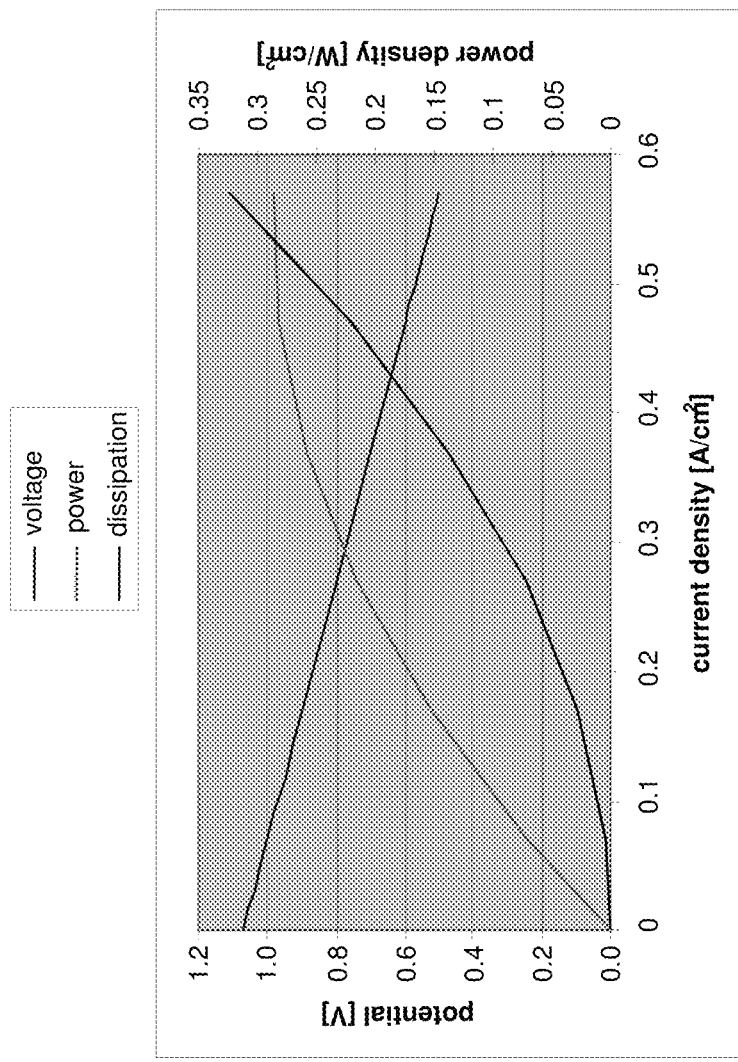
FIG. 1 is a plot of voltage, electrical power density, and heat dissipated versus current for a fuel cell.
Figure 2:
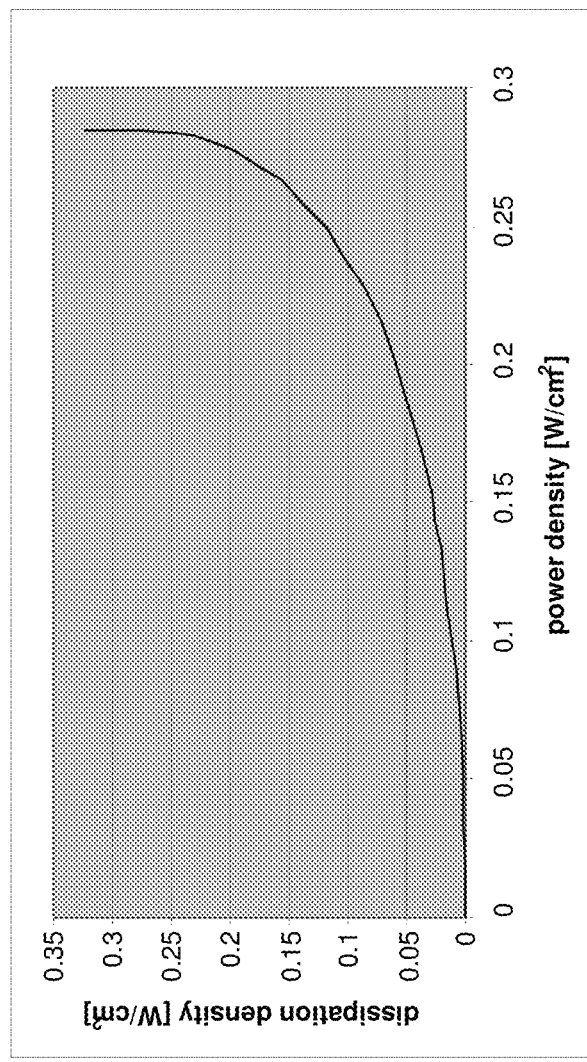
FIG. 2 is a plot of electrical power density versus heat dissipated.

FIG. 1 shows the voltage, electrical power density (per unit area), and heat dissipation density (per unit area) by a single, typical SOFC as a function of current density (per unit area). The voltage can be adequately described as a linear function of current density (with the slope being the "area specific resistance" ("ASR")). Power, which is current times voltage, is therefore a quadratic function of current. Heat dissipation of a cell is also a quadratic function of current. FIG. 2 shows the same data as FIG. 1 with the heat dissipation density plotted against electrical (i.e., output) power density. It can be seen that dissipation density increases in a square root fashion rather than in a linear function when output power density approaches its maximum. This indicates that a reduction in output power density will lead to a largely over proportional reduction in heat dissipation density, which at low output power density creates difficulties for maintaining cell operating temperature.

In a fuel cell system containing a plurality of stacks, the stacks can be separately connected to the power system containing at least one of a power conditioning subsystem and a power control subsystem, and thereby individually controlled, with different stacks providing different output power. Individual stack control allows an increase in heat dissipation at low or partial electrical load.

In one non-limiting example of the above principle, the system contains two stacks. If one stack is operated above half of the total desired or required output power and the other stack is operated below half of the total desired or required output power, such that the sum of the output power still meets the total desired or required output power, then the combined thermal dissipation of the two stacks will be higher compared to operation of both stacks at an equal output power of half the total desired or required output power.

For example, if the total desired output power of the system equals 0.4 $W/cm^2$, and if the first stack is operated at 0.25 $W/cm^2$, and the second stack is operated at 0.15 $W/cm^2$, then the total system output power would equal to 0.4 $W/cm^2$, and the total system heat dissipation would equal to about 0.15 $W/cm^2$ from FIG. 2 (i.e., 0.12 $W/cm^2$ from the first stack +0.03 $W/cm^2$ from the second stack). In contrast, if both stacks are operated at 0.2 $W/cm^2$, then the total system output power would still equal to 0.4 $W/cm^2$, but the total system heat dissipation would equal to only about 0.12 $W/cm^2$ from FIG. 2 (i.e., 0.06 $W/cm^2$ from both the first and the second stacks). Thereby, the nonlinear relationship between power and heat dissipation shown in FIG. 2 is advantageously used to increase the total system heat dissipation without changing the system output power. In the two stack system example described above, an about 20% increase in heat dissipation may be obtained by varying the output power of each stack by 0.05 $W/cm^2$ from the 50% value of the total desired output power. This simple scheme allows system operation at reduced loads while maintaining reasonably high thermal dissipation.

It should be noted that the above described method is not limited to operating two stacks at different output power. For example, the system may contain three or more stacks, such as four to ten stacks for example. The stacks in the system may be separated into two or more arbitrary sets of stacks, where each set contains one or more stacks. Stacks in different sets operate at different output powers, but stacks in the same set operate at the same power. Thus, the stacks in the system may be operating at the same time at three or more different output powers if desired.

In one aspect of the invention, a software program is used to determine the optimum distribution of output powers of the stacks in the system. In this case, the corresponding heat dissipation data for each output power of each stack (i.e., data similar to that shown in FIG. 2) is provided into the software along with the number of stacks in the system, the desired or required total output power of the system, and any other parameters, such as the number of sets of stacks which operate at different output powers (i.e., the number of different output powers provided from the stacks). The program then solves an optimization equation to determine the preferred output power for stack to obtain the desired or required heat dissipation.

Figure 3A:
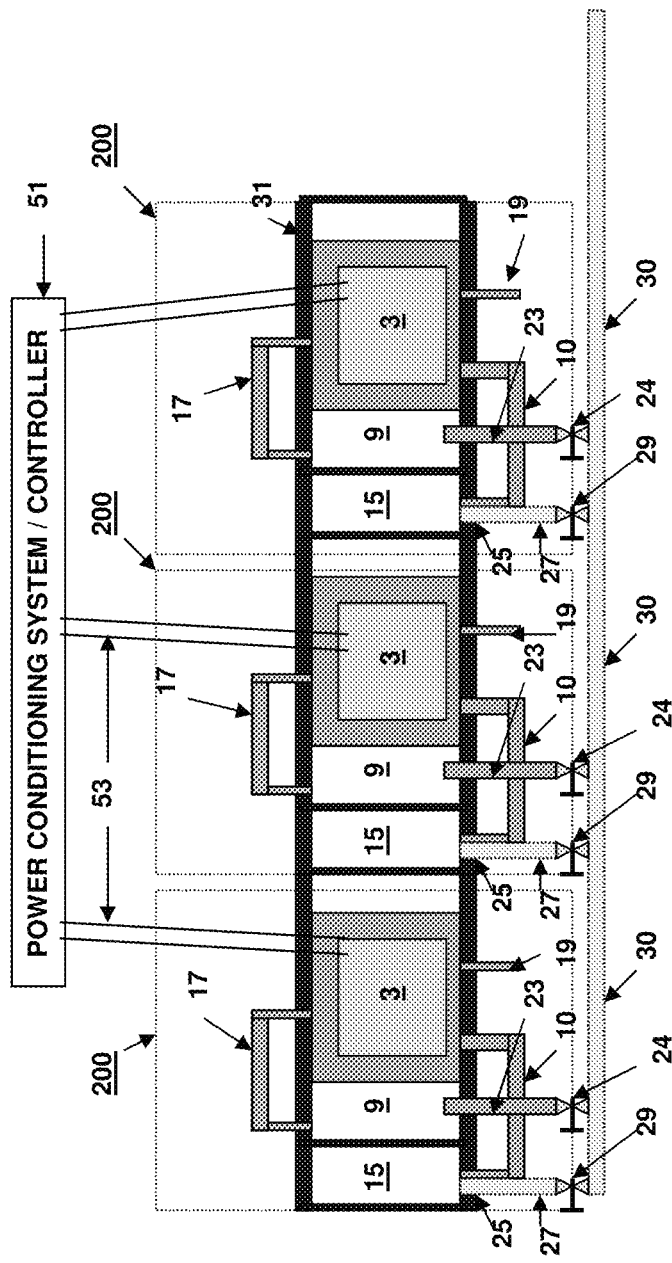

In a first embodiment of the invention, separate power conversion equipment connection and preferably separate fuel supplies are provided for every stack in order to increase the thermal dissipation by operating different stacks at different output power. In this embodiment, as shown in FIGS. 3A and 3B, a separate fuel inlet conduit and a separate fuel flow control device is provided for each stack. The amount of fuel being provided into each stack is controlled in coordination with the output power of the stacks. Thus, less fuel is provided into the stacks that are operating at lower output power than into the stacks that are operating at higher output power to avoid wasting fuel. In other words, the amount of fuel provided to each of the plurality of fuel cell stacks is preferably but not necessarily separately controlled, such that more fuel is provided to one or more stacks operating at the first output power than to one or more stacks operating at the second output power which is lower than the first output power. Each stack is separately electrically connected to the power system which contains one or both of a conditioning subsystem/power controller. For example, a separate inverter dedicated to each stack or each set of stacks may be provided. It should be noted that if two or more stacks are grouped into a set of stacks that are adapted to operate at the same output power, then such stacks may share a common fuel inlet conduit and/or be connected in series to the power system.

In a second embodiment of the invention, the increased thermal dissipation is obtained without utilizing separate fuel feed conduits and controllers for each stack. In the method of the second embodiment, a difference in time response between the electrical and the fuel (i.e., gas) subsystems is exploited. In the second embodiment, the load on the stacks is varied at a rate much faster than time constants involved in the (local) fuel transport to multiple stacks. Thus, multiple fuel cell stacks can operate at different output power levels on a common fuel supply while subject to load changes. In this embodiment, the change in current occurs fast enough to avoid local fuel or oxidizer starvation of the cells in the stack. This may require load variations in the kHz regime or higher. Thus, the output power of the stacks in varied faster than the time it takes for local fuel or oxidizer starvation of the cells in the stack to set in.

For example, in case of two stacks, the first stack is operated at a higher output power and the second stack is operated at a lower power for a short period of time (i.e., for a period of time shorter than the time it takes for local fuel or oxidizer starvation of the cells in the stack to set in). Then, the output power of the stacks is switched, such that the first stack is operated at a lower power and the second stack is operated at a higher power for a short period of time (i.e., for a period of time shorter than the time it takes for local fuel or oxidizer starvation of the cells in the stack to set in). Then, the output power of the stacks is changed again such that the first stack is again operated at a higher output power and the second stack is again operated at a lower power for a short period of time. Thus, the load on the stacks is switched or alternated frequently, for example, at least once every one thousandths of a second (i.e., with a load variation frequency of 1 kHz or higher) to avoid local fuel or oxidizer starvation of the cells. It should be noted that more than two stacks and/or more than two output powers may be used, as described above. In this case a plurality of fuel cell stacks comprise at least a first set of fuel cell stacks containing one or more first stacks and a second set of fuel cell stacks containing one or more second stacks. Preferably, the same amount of fuel is provided to each of the one or more first fuel cell stacks and to each of the one or more second fuel cell stacks. The load on the first and the second sets of stacks is repeatedly varied such that the output power of the first is alternately higher or lower than the output power of second sets of stacks. The output power/load switching is preferably conducted by an automated controller, such as a computer or logic circuit. Furthermore, software or hardware may be used to determine an optimum switching frequency and output power for the system.

It is believed that heat dissipation is mostly ohmic and will respond instantaneously to changes in stack load/output power. However, the thermal response of the system is typically slower than the fluids system. Therefore, this load modulation will cause negligible temperature oscillations of the system as a whole. The relationship between the time constants of the mechanisms in the system of the second embodiment is illustrated in equation 1:

$$\tau_{electrical} \ll \tau_{fluid} \tag{1}$$

If multiple stacks are independently connected to a power system (i.e., to a single power conditioning subsystem/controller that is able to independently control the stack load and output power, or to a plurality of independent power conditioning subsystems/controllers each of which is associated with one or more stacks of the system), then these load modulations can be executed with a constant net stack output. For example, a separate inverter dedicated to each stack or each set of stacks may be provided.

If a multitude of stacks is simultaneously load modulated, the net output of the stacks may fluctuate. For a load modulation at high frequency, the energy storage required to level the stack output is small and can easily be provided by one or more capacitors or batteries which may already be a part of the system. Thus, one or more capacitors and/or batteries can be used to store excess energy generated during output power spikes and then release the stored energy during output power dips to provide a substantially even power output from the system.

It should be noted that the stack load modulations may include reversed current operation of one or more stacks (i.e., reversing a polarity of current provided to the stacks). Thus, rather than decreasing the power output of some stacks, the stacks may be temporarily operated in the so-called electrolysis mode, where the stacks draw electrical energy from the power conditioning system rather than provide electrical energy to the power conditioning system. These temporary current inversions on fuel cells may reduce cell degradation and thereby increase performance. Without wishing to be bound by a particular theory, it is believed that if a suitable reducing or inert atmosphere is provided to the fuel cell fuel (i.e., anode) electrodes, then the cermet in the fuel electrodes may be reduced during the current inversions to improve the operation of the fuel cells. Examples of the fuel electrode cermets include nickel and yttria stabilized zirconia containing cermets and examples of a reducing or inert atmosphere include nitrogen, hydrogen or argon.

In a third embodiment of the invention, an output power of one or more stacks is periodically cycled (i.e., varied) above and below an average desired or required output power, such that the output power substantially equals the average desired or required output power over a period of time. In this embodiment, the fuel cell stacks need not be thermally integrated with other stacks (i.e., the fuel cell stacks may be thermally isolated from other stacks). Furthermore, only one stack may be used instead of a plurality of stacks.

In this embodiment, electrical energy is stored and released in an energy storage device, such as one or more capacitors and batteries. The electrical energy is stored in a storage device when the stack output power is above the average total desired or required output power. The stored electrical energy is released from the storage device when the output power is below the average total desired or required output power.

Preferably, the system of this embodiment comprises a plurality of solid oxide fuel cell stacks. The output power of each of the plurality of solid oxide fuel cell stacks is periodically cycled above and below an average desired or required output power at the same time. In other words, all of the stacks in this embodiment are either at a high or low output power at the same time. In this case, the combined thermal dissipation of the plurality of the stacks is still higher compared to the thermal dissipation of the plurality of the stacks operated at a constant output power over the period of time.

In the third embodiment, the same power controller/power conditioning system may be used to operate all of the stacks. Furthermore, the same amount of fuel may be supplied to all of the stacks in the system. Thus, the system design is simplified since only one power controller/power conditioning system and one fuel supply control device is needed for the whole system. Preferably, the fuel supply control device controls the supply of fuel to provide a lower amount of fuel to the stacks during low output power part of the cycle than during a high output power part of the cycle. Likewise, if desired, an oxidizer supply control device, such as an air blower or valve, controls the supply of oxidizer, such as air, to provide a lower amount of oxidizer to the stacks during low output power part of the cycle than during a high output power part of the cycle.

The output power cycle frequency may range from high to low cycle frequency. For example, the cycle frequency may range from several output power variations per second, such as 2-20 variations per second, to one output power variation per one or more seconds, such as one variation per 1-60 seconds, to one output power variation per one or more minutes, such as one variation per 1-120 minutes, for example, one variation per 1 to 10 minutes. Thus, each high and low output power duration may last less than a second, several seconds, several minutes or even one or more hours.

SOFC stacks generally have significant thermal inertia and the operating temperature can in certain cases be allowed to drift slightly up or down, such as by a few degrees, such as 5-20 degrees C., up to 100 C up or down. If one or more stacks are cycled between low and high load to match an average load the stack, then thermal dissipation will increase. It should be noted that the output power cycling is preferably not done in response to a different output power demand by the power consumer (i.e., a stand alone device or the power grid) which receives power from the fuel cell system. Thus, to increase the thermal dissipation, the fuel cell system output power is intentionally cycled above and below the output power (i.e., the average power) actually desired or required by the power consumer. The energy storage device is used to provide a substantially constant output power to the power consumer such that the consumer does not notice the output power cycling by the fuel cell system. Thus, the power consumer can receive power from both the fuel cell system and the energy storage device.

FIG. 3A illustrates a fuel cell system 1 according to a first preferred embodiment of the invention in which separate fuel inlet conduits and fuel controllers are used for different fuel cells. Preferably, the system 1 is a high temperature fuel cell stack system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode.

The system 1 contains a plurality of high temperature fuel cell stacks 3. Each of the stacks 3 may contain a plurality of SOFCs, SORFCs or molten carbonate fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, seals, fuel cell housing and insulation. In a SOFC operating in the fuel cell mode, the oxidizer, such as air or oxygen gas, enters the cathode chamber, while the fuel, such as hydrogen and/or hydrocarbon fuel, enters the anode chamber. Any suitable fuel cell designs and component materials may be used.

The system 1 also preferably contains a plurality of reformers 9 and combustors 15. However, for some systems, the reformers and/or combustors may be omitted. For example, for systems that operate directly on hydrogen fuel, the reformers and combustors may be omitted. Each reformer 9 is adapted to reform a hydrocarbon fuel to a hydrogen containing reaction product and to provide the reaction product to a fuel cell stack 3. Each combustor 15 is preferably thermally integrated with one or more of the plurality of the reformers 9 to provide heat to the reformers 9. The term "thermally integrated" in this context means that the heat from the reaction in the combustor 15 drives the net endothermic fuel reformation in one or more reformers 9.

Humidified fuel is provided in each reformer through a respective fuel inlet conduit 23. The system 1 also contains one or more control devices 24 adapted to independently control an amount of fuel being provided to each reformer 9 through each fuel inlet conduit 23 in response to the load on each associate stack 3.

The one or more control devices 24 may comprise one or more flow controllers, such as fuel flow control valves, that are adapted to control fuel flow into each fuel inlet conduit. Preferably, each flow controller valve 24 is located in each of the plurality of the fuel inlet conduits 23. The valves 24 may be controlled manually by an operator or automatically controlled by a control system, such as a computer or another electronic control system. If desired, instead of multiple valves 24, a single, centrally located flow control device, such as a multi-outlet valve, may be used to independently control the fuel flow into each of the fuel inlet conduits 23 from one or more fuel supply conduits 30 or fuel vessels.

Each reformer 9 is operatively connected to a respective stack 3 anode inlet via a conduit 17 to provide a reformed product or fuel into each stack 3. Air is provided into each stack 3 through a cathode inlet 19. The cathode exhaust outlet 10 of each fuel cell stack 3 is preferably operatively connected to an inlet 25 of at least one combustor 15 to provide an oxidizer, such as hot air, into the combustor 15.

The term "operatively connected" means that components which are operatively connected may be directly or indirectly connected to each other. For example, two components may be directly connected to each other by a fluid (i.e., gas and/or liquid) conduit. Alternatively, two components may be indirectly connected to each other such that a fluid stream passes between the first component to the second component through one or more additional components of the system.

Each of a plurality of hydrocarbon fuel sources or feed conduits 27 is also operatively connected to a respective combustor 15 inlet 25. Preferably, each inlet 25 of each combustor 15 is connected to a separate hydrocarbon fuel source or feed conduit 27. It should be noted that for systems which lack the combustors and/or reformers, the fuel may be provided directly into the fuel cell. The conduits 24 and 27 may be connected to the same fuel supply conduit 30 or vessel, or the conduits 24, 27 may be connected to different fuel supply conduits or vessels. Thus, the same or different fuel may be provided to the reformers 9 and combustors 15, as desired.

The system 1 may also optionally contain one or more control devices 29 adapted to independently control an amount of fuel being provided to each combustor through each fuel feed conduit 27 to independently control a temperature of each combustor 15. The independent control of a temperature of each combustor 15 provides independent control of an amount of heat provided to each thermally integrated reformer 9, which in turn provides an independent control of a temperature of each thermally integrated reformer 9. Furthermore, the independent control of a temperature of each reformer 9 provides independent control of a temperature of each associated stack 3 which receives the reaction product from the controlled reformer 9. In other words, by independently controlling the fuel flow to the combustors 15, the temperature of each associated reformer 9 and stack 3 may also be independently controlled. The one or more control devices 29 may comprise one or more flow controllers, such as fuel flow control valves, that are adapted to control fuel flow into each fuel feed conduit 27, similar to valves 24. One or more sensors may be located in the system 1 which are used to determine if one or more reformers 9 require additional heat and/or how much additional heat is required. These sensors may be reformer temperature sensor(s) which measure the reformer temperature and/or process parameter sensor(s), which measure one or more of fuel utilization, stack efficiency, heat loss and stack failure/turndown. The output of the sensor(s) is provided to a computer or other processor and/or is displayed to an operator to determine if and/or how much additional heat is required by each reformer. The processor or operator then independently controls each combustor's heat output based on the step of determining to provide a desired amount heat from the controlled combustor to the desired reformer.

The stacks 3 are electrically connected to a power system 51 comprising a power conditioning and/or control subsystems via separate electrical connections 53, such as via separate wires. The system 51 may comprise any suitable power conditioning subsystem which conditions electrical power received from the fuel cell stacks. Preferably, the system 51 also comprises an electrical controller or controllers which control the load on the stacks 3 and the power output generated by the stacks 3. The power conditioning and control functions may be provided by separate components. Furthermore, the system 51 may comprise separate power conditioning and/or control subsystems for each stack 3.

The hydrocarbon fuel reformers 9 may be any suitable devices which are capable of partially or wholly reforming a hydrocarbon fuel to form a carbon containing and free hydrogen containing fuel. For example, each fuel reformer 9 may be any suitable device which can reform a hydrocarbon gas into a gas mixture of free hydrogen and a carbon containing gas. For example, the fuel reformer 9 may reform a humidified biogas, such as natural gas, to form free hydrogen, carbon monoxide, carbon dioxide, water vapor and optionally a residual amount of unreformed biogas by a steam methane reformation (SMR) reaction. The free hydrogen and carbon monoxide are then provided into the fuel inlet of one or more the fuel cell stacks 3 which are operatively connected to each reformer.

Preferably, each fuel reformer 9 is thermally integrated with one or more of the fuel cell stacks 3 to support the endothermic reaction in the reformer 9 and to cool the stack or stacks 3. The term "thermally integrated" in this context means that the heat from the reaction in the fuel cell stack 3 drives the net endothermic fuel reformation in the fuel reformer 9. The fuel reformer 9 may be thermally integrated with one or more fuel cell stacks 3 by placing the reformer and stack(s) in the same hot box 31 and/or in thermal contact with each other, or by providing a thermal conduit or thermally conductive material which connects the stack(s) to the reformer.

As shown in FIG. 3A, each reformer 9 is preferably located in close proximity to at least one stack 3 to provide radiative and convective heat transfer from the stack 3 to the reformer. Preferably, the cathode exhaust conduit of each stack 3 is in direct contact with a respective reformer 9. For example, one or more walls of each reformer 9 may comprise a wall of the stack cathode exhaust conduit 10 of the adjacent stack 3. Thus, each stack's cathode exhaust provides convective heat transfer from each stack 3 to one or more adjacent reformers 9.

Furthermore, if desired, the cathode exhaust from each stack 3 may be wrapped around the adjacent reformer 9 by proper ducting and fed to the combustion zone of the combustor 15 adjacent to the reformer 9, as shown in FIGS. 4-6 and as described in more detail below.

The combustors 15 provide a supplemental heat to one or more reformers 9 to carry out the steam-methane reformation (SMR) reaction during steady state operation. Each combustor 15 may be any suitable burner which is thermally integrated with one or more reformers 9. Each combustor 15 receives the hydrocarbon fuel, such as natural gas, and the stack 3 cathode exhaust stream through inlet 25. However, if desired, another source of oxygen or air may be provided to the combustor 15 in addition to or instead of the stack cathode exhaust stream. For example, an air blower may be used to provide room temperature or preheated air into the combustor 15 inlet 25. The fuel and the source of oxygen, such as the hot air from the cathode exhaust stream, are combusted in the combustor to generate heat for heating one or more reformers 9. The combustor outlet may be operatively connected to a heat exchanger to heat one or more incoming streams provided into the fuel cell stacks, if desired.

Preferably, the supplemental heat to each reformer 9 is provided from a combustor 15 which is operating during steady state operation of the reformer (and not just during start-up) and from the cathode (i.e., air) exhaust stream of the stack 3. When no heat is required by the reformer, the combustor unit acts as a heat exchanger. Thus, the same combustor 15 may be used in both start-up and steady-state operation of the system 1.

Most preferably, the combustor 15 is in direct contact with one or more reformers 9, and the stack 3 cathode exhaust is configured such that the cathode exhaust stream contacts one or more reformers 9 and/or wraps around the reformer(s) 9 to facilitate additional heat transfer. This lowers the combustion heat requirement for SMR. Preferably, each reformer 9 is sandwiched between one combustor 15 and one or more stacks 3 to assist heat transfer. However, if desired, a plurality of combustors 15 may be used to heat each reformer 9.

As shown in FIG. 3A, the system 1 preferably contains a plurality of units 200. Each unit 200 contains one stack 3, one reformer 9 and one combustor 15. FIG. 3B illustrates a system 100 according to alternative aspect of the present invention. The system 100 is similar to system 1, except that in the system 100, each unit 201/202 comprises more than one stack 3 and/or more than one reformer 9. Preferably, but not necessarily, each unit 201/202 contains one combustor 15. A plurality of units 200 and 201/202 may be located in the same hot box 31 in order to operate different stacks 3 at a different output power to transfer heat from stacks operating at a higher output power to the stacks operating at a lower output power. However, if desired, each unit 201/202 may be located in a separate hot box 31, with the two fuel cell stacks 3 in each unit operating at a different output power. The details of each unit 200, 201 and 202 will be described in more detail below with respect to FIGS. 4, 5 and 6.

FIGS. 4-6 illustrate three exemplary configurations of one of a plurality of stack, reformer and combustor units of FIGS. 3A and 3B in the hot box 31. However, other suitable configurations are possible. The reformer 9 and combustor 15 shown in FIGS. 4-6 preferably comprise vessels, such as fluid conduits, that contain suitable catalysts for SMR reaction and combustion, respectively. The reformer 9 and combustor 15 may have gas conduits packed with catalysts and/or the catalysts may be coated on the walls of the reformer 9 and/or the combustor 15.

Figure 5A:
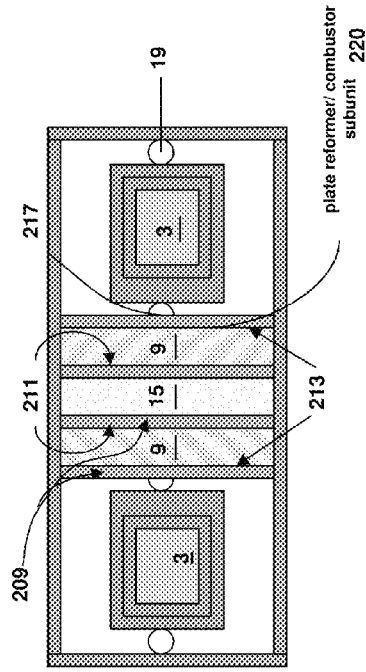

The reformer 9 and combustor 15 unit can be of cylindrical type, as shown in FIG. 4A or plate type as shown in FIGS. 5A and 6A. The plate type unit provides more surface area for heat transfer while the cylindrical type unit is cheaper to manufacture.

Preferably, the reformer 9 and combustor 15 are integrated into the same enclosure 31 and more preferably share at least one wall, as shown in FIGS. 4-6. Preferably, but not necessarily, the reformer 9 and combustor 15 are thermally integrated with the stack(s) 3, and may be located in the same enclosure or hot box 31, but comprise separate vessels from the stack(s) 3 (i.e., external reformer configuration).

FIGS. 4A and 4B show the cross-sectional top and front views, respectively, of one of a plurality of units 201 shown in FIG. 3B. Each unit 201 contains two stacks 3, and a cylindrical reformer 9/combustor 15 subunit 210. In a preferred configuration of the unit 201, fins 209 are provided in the stack cathode exhaust conduit 10 and in the combustor 15 combustion zone 207 to assist with convective heat transfer to the reformer 9. In case where the reformer 9 shares one or more walls with the cathode exhaust conduit 10 and/or with the combustion zone 207 of the combustor 15, then the fins are provided on the external surfaces of the wall(s) of the reformer. In other words, in this case, the reformer 9 is provided with exterior fins 209 to assist convective heat transfer to the interior of the reformer 9. In addition to the cathode exhaust conduit 10, each stack 3 contains an oxidizer (i.e., air) inlet conduit 19, a fuel or anode inlet conduit 223 and a fuel or anode exhaust conduit 225.

The combustion zone 207 of the combustor 15 is located in the core of the cylindrical reformer 9. In other words, the combustor 15 comprises a catalyst containing channel bounded by the inner wall 211 of the reformer 9. In this configuration, the combustion zone 207 is also the channel for the cathode exhaust gas. The space 215 between the stacks 3 and the outer wall 213 of the reformer 9 comprises the upper portion of the stack cathode exhaust conduit 10. Thus, the reformer inner wall 211 is the outer wall of the combustor 15 and the reformer outer wall 213 is the inner wall of the upper portion of stack cathode exhaust conduit 10. If desired, a cathode exhaust opening 217 can be located in the enclosure 31 to connect the upper portion 215 of conduit 10 with the lower portions of the conduit 10. The enclosure 31 may comprise any suitable container and preferably comprises a thermally insulating material.

Figure 5B:
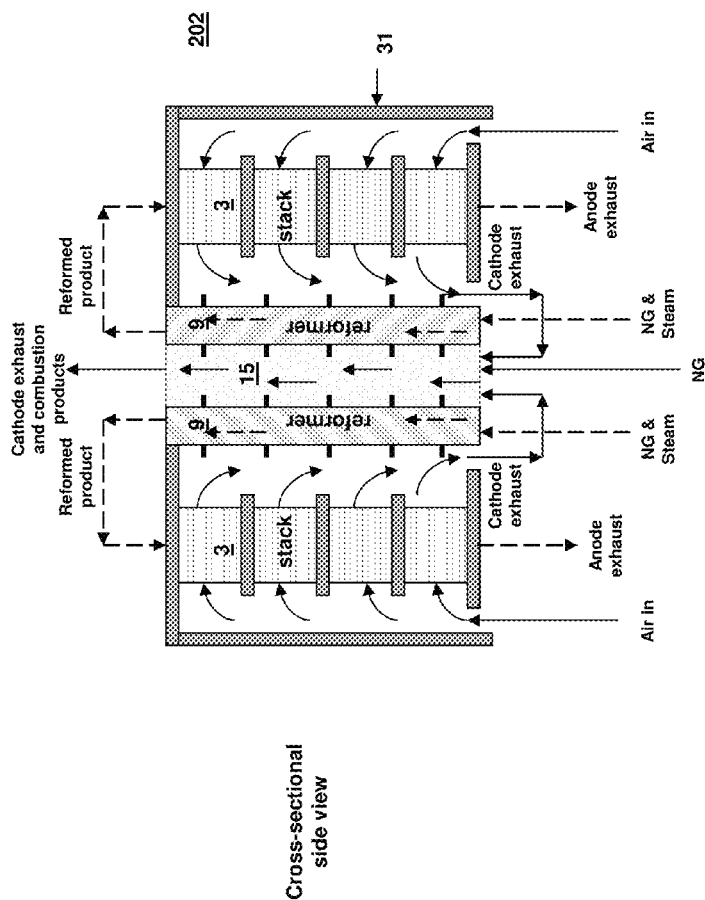

FIGS. 5A and 5B show the cross-sectional top and front views, respectively, of an alternative unit 202 containing two stacks 3 and a plate type reformer 9 coupled with a plate type combustor 15. In this configuration, each combustor is thermally integrated with two reformers. The configuration of the plate type reformer-combustor subunit 220 is the same as the cylindrical reformer-combustor subunit 210 shown in FIGS. 4A and 4B, except that the reformer-combustor subunit 220 is sandwich shaped between the stacks. In other words, the combustion zone 207 is a channel having a rectangular cross sectional shape which is located between two reformer 9 portions. The reformer 9 portions comprise channels having a rectangular cross sectional shape. The fins 209 are preferably located on inner 211 and outer 213 walls of the reformer 9 portions. The plate type reformer and combustion subunit 220 provides more surface area for heat transfer compared to the cylindrical unit 210 and also provides a larger cross-sectional area for the exhaust gas to pass through. Thus, in the embodiments of FIGS. 4 and 5, each unit 201 and 202 contains two stacks 3, one combustor 15 and one or two reformers 9, respectively.

FIGS. 6A and 6B show the cross-sectional top and front views, respectively, of one of a plurality of units 200 shown in FIG. 3A. The unit 200 contains one stack 3 and a plate type reformer 9 coupled with a plate type combustor 15. In this configuration, each combustor is thermally integrated with one reformer. Exhaust gas is wrapped around the reformer 9 from one side. One side of the combustion zone 207 channel faces insulation of the container or hot box 31 or the stacks of adjacent unit 200 while the other side faces the reformer 9 inner wall 211. In this case, each unit 200 contains a single stack 3, reformer 9 and combustor 15.

A method of operating the system 1 according to a first preferred embodiment of the present invention is described with reference to FIGS. 3A and 3B. The power conditioning/control system 51 independently controls the load on the stacks 3 and the output power of the stacks 3.

On the fuel side, the preheated hydrocarbon fuel inlet stream and steam enter each one of the reformers 9 through separately controlled inlet conduits 23 where the fuel is reformed into a reformate (i.e., a hydrogen and carbon containing gas). The valves 24 control the amount of fuel provided to each reformer 9 based on the load and output power of each stack 3 which receives the reformed fuel from each reformer 9. The reformed fuel (i.e., reformate) then enters the stack 3 anode inlet from the reformer 9 through conduit 17. The stack anode exhaust stream exists the anode outlet 225 of the stack 3 and may be provided to a heat exchanger where it preheats a stream being provided into one or more stacks 3.

A preheated air inlet stream is provided into the cathode inlet 19 of each of the stacks 3. The air then exits the stack 3 as a cathode exhaust stream and wraps around one or more reformers 9. The cathode exhaust stream then enters the combustion zone of the combustor 15 through conduit 10 via opening 217 and inlet 25.

The system 1 is preferably configured such that the cathode exhaust (i.e., hot air) exits on the same side of the system as the inlet of the reformer 9. For example, as shown in FIG. 4B, since the mass flow of hot cathode exhaust is the maximum at the lower end of the device, it supplies the maximum heat where it is needed, at feed point of the reformer 9 (i.e., the lower portion of the reformer shown in FIG. 4B). In other words, the mass flow of the hot air exiting the stack is maximum adjacent to the lower portion of the reformer 9 where the most heat is needed. However, the cathode exhaust and reformer inlet may be provided in other locations.

Desulfurized natural gas or another hydrocarbon fuel is also supplied from the fuel feed conduits 27 into the inlets 25 of the combustors 15. Natural gas is injected into the central combustion zone 207 of the combustor 15 where it mixes with the hot cathode exhaust. The circular or spiral fins are preferably attached to the inner 211 and outer 213 reformer walls to assist heat transfer. Heat is transferred to the outer wall 213 of the reformer 9 from the stack 3 by convection and radiation. Heat is transferred to the inner wall 211 of the reformer by convection and/or conduction from the combustion zone 207.

As noted above, the reformer and combustion catalysts can either be coated on the walls or packed in respective flow channels. The exhaust stream from each of the combustors 15 then preferably enters a heat exchanger where it exchanges heat with an incoming stream being provided to one or more stacks 3.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a high temperature fuel cell system comprising fuel cell stacks divided into at least a first group and a second group, each group including at least one of the fuel cell stacks, the method comprising:
   outputting substantially the same output power from the first and second groups, such that the first and second groups collectively output a predetermined output power; and
   increasing a power output of the first group to a first output power, and decreasing a power output of the second group to a second output power that is less than the first output power;
   wherein a sum of the first and second output powers is at least equal to the predetermined output power.

2. The method of claim 1, wherein a combined thermal dissipation of the fuel cell stacks, when the first group outputs the first power and the second group outputs the second power, is higher than a combined thermal dissipation of the fuel cell stacks when the first and second groups output a same output power.

3. The method of claim 2, wherein each one of the fuel cell stacks is thermally integrated with one or more other fuel cell stacks, such that each one of the fuel cell stacks provides dissipated heat to one or more other fuel cell stacks or absorbs heat from one or more other fuel cell stacks.

4. The method of claim 1, further comprising separately controlling an amount of fuel provided to each of the fuel cell stacks, such that more fuel is provided to the first group when outputting a first output power than to the second group when outputting the second output power.

5. The method of claim 1, wherein each of the fuel cell stacks is separately electrically connected to at least one of a power conditioning subsystem and a power control subsystem.

6. The method of claim 1, wherein the fuel cell stacks comprise solid oxide fuel cell stacks, and further comprising operating three or more groups of fuel cell stacks at different output powers.

7. The method of claim 1, wherein the first group and the second group each comprise at least two of the fuel cell stacks.

8. The method of claim 1, wherein the first group and the second group each comprise the same number of fuel cell stacks.

9. The method of claim 1, further comprising supplying fuel to the fuel cell stacks using a common fuel supply.

10. The method of claim 1, wherein the predetermined output power is value a desired total output power from the plurality of fuel cell stacks.

* * * * *